United States Patent
Hasegawa (10) Patent No.: US 7,215,978 B2
(45) Date of Patent: May 8, 2007

(54) MOBILE TERMINAL APPARATUS, MOBILE TERMINAL SETTINGS CHANGING SYSTEM, METHOD USED THEREFOR, AND PROGRAM THEREOF

(75) Inventor: Yuka Hasegawa, Tokyo (JP)

(73) Assignee: NEC Corporation, Tokyo (JP)

(*) Notice: Subject to any disclaimer, the term of this patent is extended or adjusted under 35 U.S.C. 154(b) by 256 days.

(21) Appl. No.: 10/671,481

(22) Filed: Sep. 29, 2003

(65) Prior Publication Data

US 2004/0072592 A1 Apr. 15, 2004

(30) Foreign Application Priority Data

Oct. 9, 2002 (JP) .............................. 2002-295529

(51) Int. Cl.
- H04B 1/38 (2006.01)
- H04Q 7/20 (2006.01)
- H04M 1/66 (2006.01)
- H04M 3/00 (2006.01)
- H04M 1/00 (2006.01)
- H04K 1/00 (2006.01)
- H04L 9/00 (2006.01)

(52) U.S. Cl. ................ 455/558; 455/456.4; 455/550.1; 455/410; 455/420; 380/270; 713/168

(58) Field of Classification Search ...... 455/41.1–41.3, 455/410–411, 418–420, 66.1, 68–69, 550.1, 455/552.1, 556.1, 557–558, 456.1–456.6, 455/88, 414.1, 556.2; 235/462.46, 472.02; 380/247–250, 270, 281–282, 258; 713/155–156, 713/161–162, 171–172, 175, 168; 379/433, 379/433.09, 91.01, 106.11, 357.02, 443; 340/7.58, 7.61, 7.39

See application file for complete search history.

(56) References Cited

U.S. PATENT DOCUMENTS

| | | | |
|---|---|---|---|
| 5,761,309 A * | 6/1998 | Ohashi et al. | 713/156 |
| 5,923,761 A * | 7/1999 | Lodenius | 455/73 |
| 6,032,055 A * | 2/2000 | Yazaki et al. | 455/558 |
| 6,298,247 B1 * | 10/2001 | Alperovich et al. | 455/558 |
| 6,729,550 B2 * | 5/2004 | Seita et al. | 235/492 |
| 6,898,445 B2 * | 5/2005 | Slettengren et al. | 455/567 |
| 6,973,327 B2 * | 12/2005 | Seita | 455/550.1 |
| 7,031,945 B1 * | 4/2006 | Donner | 705/64 |
| 2002/0028674 A1 * | 3/2002 | Slettengren et al. | 455/422 |

(Continued)

FOREIGN PATENT DOCUMENTS

EP 1 217 792 A1 6/2002

(Continued)

Primary Examiner—Meless Zewdu
(74) Attorney, Agent, or Firm—Sughrue Mion, PLLC (57) ABSTRACT

A settings changing system can power off only the mobile terminal apparatus of a user entering a specific institution without fail. The mobile terminal apparatus obtains ticket information from a ticket issue server through a base station and a network, and stores the information on a built-in contactless IC card. When the mobile terminal apparatus is put over a reader/writer mounted in the gate of a concert hall, theater, stadium, etc., the settings of the mobile terminal apparatus are automatically rewritten according to information from the reader/writer through the contactless IC card, and the set state (ON/OFF of the power and the manner mode) of the mobile terminal apparatus is changed.

19 Claims, 8 Drawing Sheets

U.S. PATENT DOCUMENTS

| | | | |
|---|---|---|---|
| 2002/0037714 A1* | 3/2002 | Takae et al. | 455/419 |
| 2002/0040308 A1* | 4/2002 | Hasegawa et al. | 705/5 |
| 2002/0065070 A1 | 5/2002 | Naiki | |
| 2002/0082002 A1 | 6/2002 | Fujii | |
| 2002/0119788 A1* | 8/2002 | Parupudi et al. | 455/456 |
| 2002/0177407 A1* | 11/2002 | Mitsumoto | 455/41 |
| 2003/0109218 A1* | 6/2003 | Pourkeramati et al. | 455/3.05 |
| 2003/0141989 A1* | 7/2003 | Arisawa et al. | 340/870.01 |
| 2003/0174839 A1* | 9/2003 | Yamagata et al. | 380/270 |
| 2004/0058705 A1* | 3/2004 | Morgan et al. | 455/556.1 |

FOREIGN PATENT DOCUMENTS

| | | |
|---|---|---|
| JP | 2000-268215 A | 9/2000 |
| JP | 2000-332676 A | 11/2000 |
| JP | 2001-078263 A | 3/2001 |
| JP | 2002-83087 A | 3/2002 |
| JP | 2002-158761 A | 5/2002 |
| JP | 2002-199457 A | 7/2002 |
| JP | 2003-179683 | 6/2003 |

* cited by examiner

|  | MODE #1 | MODE #2 |
|---|---|---|
| SOUND VOLUME FUNCTION | OFF (DISABLED STATE) | OFF (DISABLED STATE) |
| VIBRATION FUNCTION | OFF (DISABLED STATE) | ON (ENABLED STATE) |
| OFFLINE FUNCTION | ON (ENABLED STATE) | OFF (DISABLED STATE) |

MODE #1: HOSPITAL MODE
MODE #2: CONCERT MODE

MOBILE TERMINAL APPARATUS, MOBILE TERMINAL SETTINGS CHANGING SYSTEM, METHOD USED THEREFOR, AND PROGRAM THEREOF

BACKGROUND OF THE INVENTION

1. Field of the Invention

The present invention relates to a mobile terminal apparatus, a mobile terminal settings changing system, a method used therefor, and a program thereof, and more specifically to a method for automatically turning off the power of a mobile terminal apparatus.

2. Description of the Related Art

That use of mobile terminal apparatuses should be regulated (kept in the power-off state) depending on the places where they are used, for example, public areas such as trains, station areas, theaters, hospitals, etc. However, the widespreading use of mobile terminal apparatuses promotes public nuisance by bad manners. This can become more than bad manners because of the undesired influence of radio waves from the mobile terminal apparatus on electric medical appliances, etc.

Users are supposed to manually power off their own mobile terminal apparatuses, or set them in a manner mode when entering the places (public areas) where the use of these mobile terminal apparatuses are regulated. However, this rule on a voluntary basis does not work at all.

Therefore, methods are proposed for automatically powering off the mobile terminal apparatuses or setting them in the manner mode when they enter public areas (public institutions), including: a method of powering of f a mobile terminal apparatus by generating a sound wave signal when electromagnetic waves are detected (for example, Japanese Patent Application Laid-open No. 2000-332676); a method of powering off a mobile terminal apparatus or forcibly setting it in the manner mode by inserting a mode change command into a perch channel (for example, Japanese Patent Application Laid-open No. 2001-78263); a method of disabling communications depending on the level or the contents of a voice signal (for example, Japanese Patent Application Laid-open No. 2002-158761), etc.

To allow the mobile terminal apparatuses to be automatically powered off or set in the manner mode when their users enter public areas (public institutions), the above-mentioned conventional methods require the equipment for generating a sound wave signal and the equipment for inserting a mode change command into a perch channel mounted in public areas (public institutions), or the performance of the mobile terminal apparatuses themselves is to be enhanced (for example, a built-in voice recognition system is required).

In the technologies described in Japanese Patent Application Laid-open Nos. 2000-332676 and 2001-78263, not only the mobile terminal apparatuses of the users entering specific institutions are powered off, but also the mobile terminal apparatuses of the users who do not enter the specific institutions can be powered off. Furthermore, in the technology described in Japanese Patent Application Laid-open No. 2002-158761, the mobile terminal apparatuses of the users entering specific institutions cannot necessarily be powered off, but the levels of voice signals can be erroneously detected or the contents of voice signals can be erroneously recognized.

BRIEF SUMMARY OF THE INVENTION

The present invention aims at solving the above-mentioned problems, and providing a mobile terminal apparatus, a mobile terminal settings changing system, and a method and a program used for powering off only mobile terminals of users entering specific institutions.

A mobile terminal apparatus according to the present invention includes: a contactless IC (integrated circuit) device for use in communicating with external equipment by radio waves, and accumulating authentication information from a higher-level apparatus; and control means for enabling or disabling specified functions according to information received from the external equipment through the contactless IC device.

A mobile terminal settings changing system according to the present invention includes: a higher-level apparatus for issuing authentication information; a mobile terminal apparatus having a contactless IC (integrated circuit) device for accumulating the authentication information from the higher-level apparatus, and control means for enabling or disabling specified functions according to information received through the contactless IC device; and external equipment for communicating with the contactless IC device by radio waves, and transmitting the information to the contactless IC device after checking the authentication information received from the contactless IC device.

A mobile terminal settings changing method according to the present invention includes: a step of receiving information from external equipment through a contactless IC (integrated circuit) device stored in a mobile terminal apparatus for use in communicating with the external equipment by radio waves, and accumulating authentication information from a higher-level apparatus; and a step of enabling or disabling specified functions of the mobile terminal apparatus according to the received information.

A program in a mobile terminal settings changing method according to the present invention is used to direct a computer to perform: a process of receiving information from external equipment through a contactless IC (integrated circuit) device stored in a mobile terminal apparatus for use in communicating with the external equipment by radio waves, and accumulating authentication information from a higher-level apparatus; and a process of enabling or disabling specified functions of the mobile terminal apparatus according to the received information.

That is, a mobile terminal apparatus according to the present invention has a contactless IC card (or a contactless IC chip), and the contactless IC card detects passage through the gate of a concert hall or a theater, a ticket gate, etc. when the user passes through the gate, the ticket gate, etc. having a built-in reader/writer based on ticket information or electronic certificate information stored in the contactless IC card after obtaining the information from a ticket issue server or a certificate authority (CA) in advance, thereby automatically changing the set state of the apparatus (to power of f the apparatus or set it in the manner mode).

Thus, the mobile terminal apparatus according to the present invention can automatically switch the set state of the apparatus in a restricted place. Therefore, only the mobile terminal apparatus of a user entering a specific institution can be powered off or set in the manner mode, etc.

DETAILED DESCRIPTION OF THE PREFERRED EMBODIMENTS

Figure 1:
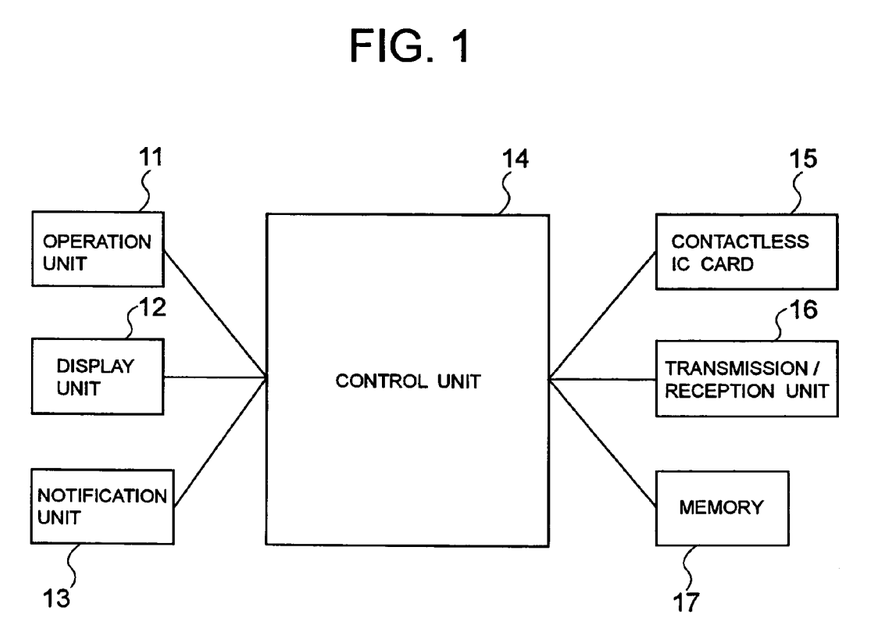
FIG. 1 is a block diagram of the configuration of a mobile terminal apparatus according to a first embodiment of the present invention.

The embodiments of the present invention are described below by referring to the attached drawings. FIG. 1 is a block diagram of the configuration of a mobile terminal apparatus according to a first embodiment of the present invention. In FIG. 1, the mobile terminal apparatus 1 according to the first embodiment of the present invention comprises an operation unit 11 for accepting an operation on the terminal 1, a display unit 12 for displaying necessary information, a notification unit 13 for giving various notifications by a signal tone and vibration, a contactless IC (integrated circuit) card 15, a transmission/reception unit 16 for performing radio communications, a memory 17 for holding a program for terminal operations (a program that can be executed on the computer) and settings, and a control unit 14 for executing the program in the memory 17 and controlling the operations of the above-mentioned units.

Figure 2:
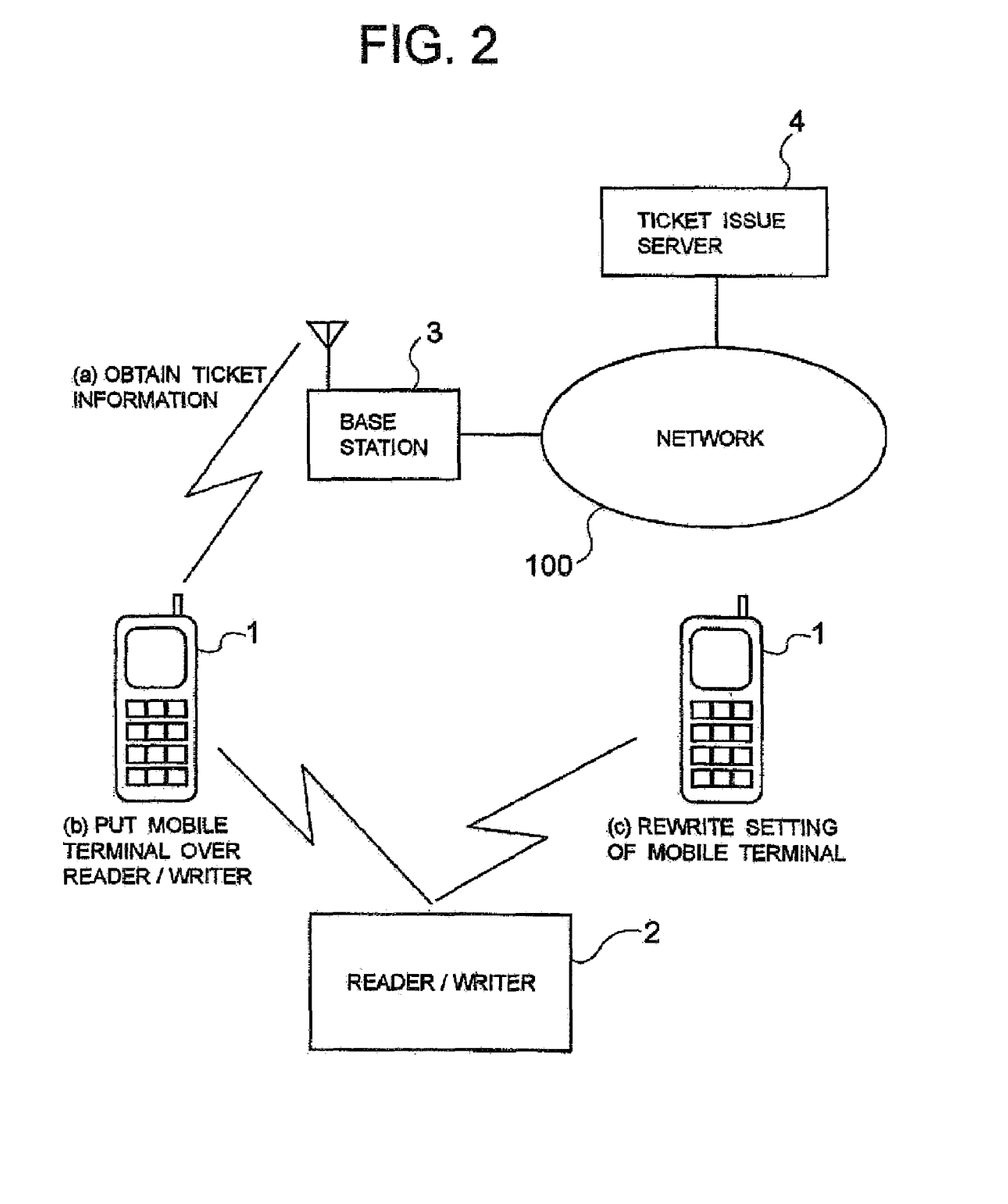
FIG. 2 shows a changing operation of the settings of the mobile terminal apparatus shown in FIG. 1.
Figure 3:
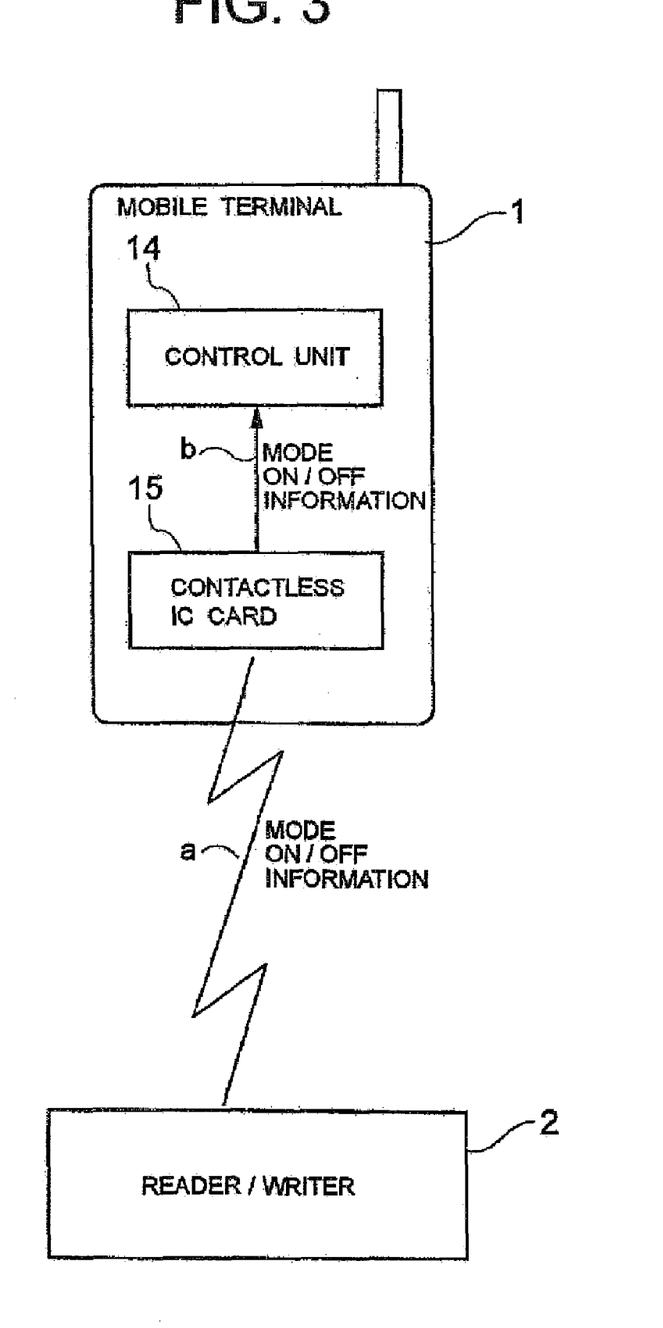
FIG. 3 shows the system of the changing operation of the settings of the mobile terminal apparatus shown in FIG. 2.
Figure 4:
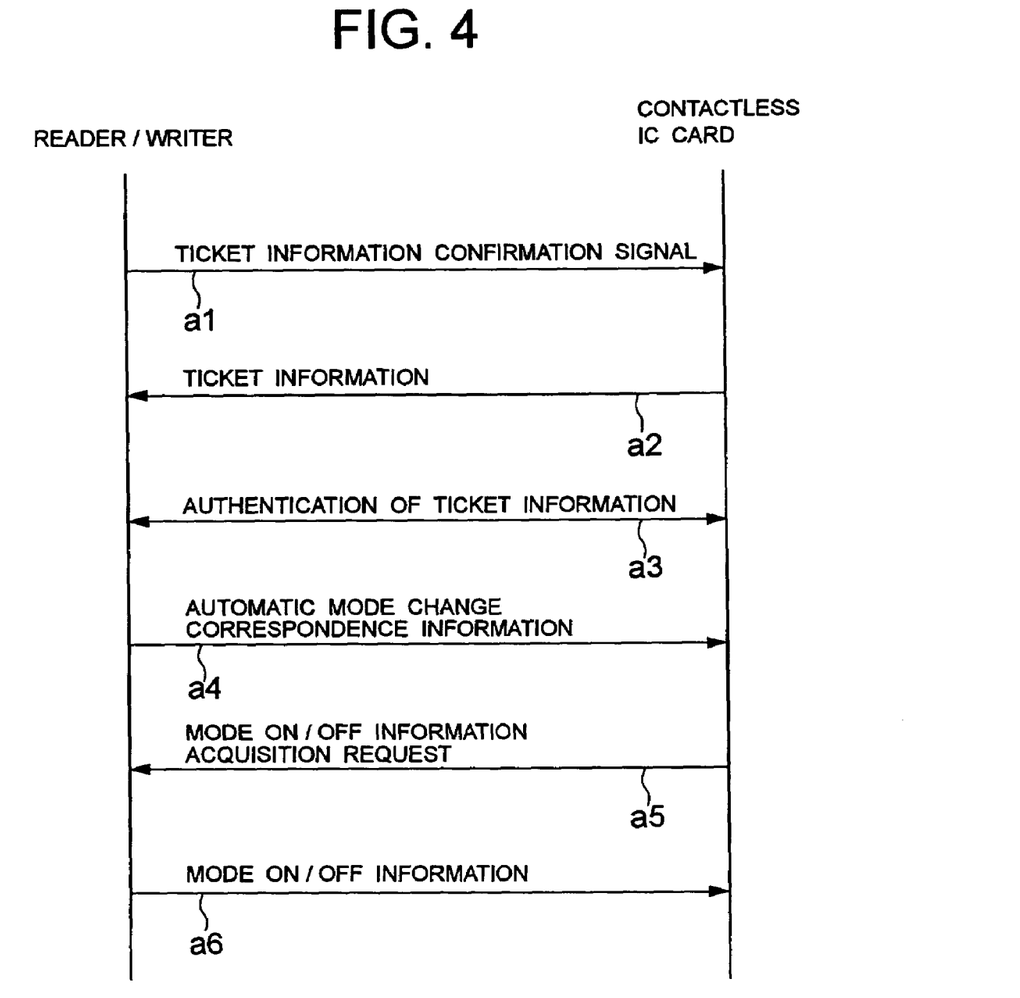
FIG. 4 is a sequential chart showing the communications of a signal in the system of the changing operation shown in FIG. 3.
Figure 5:
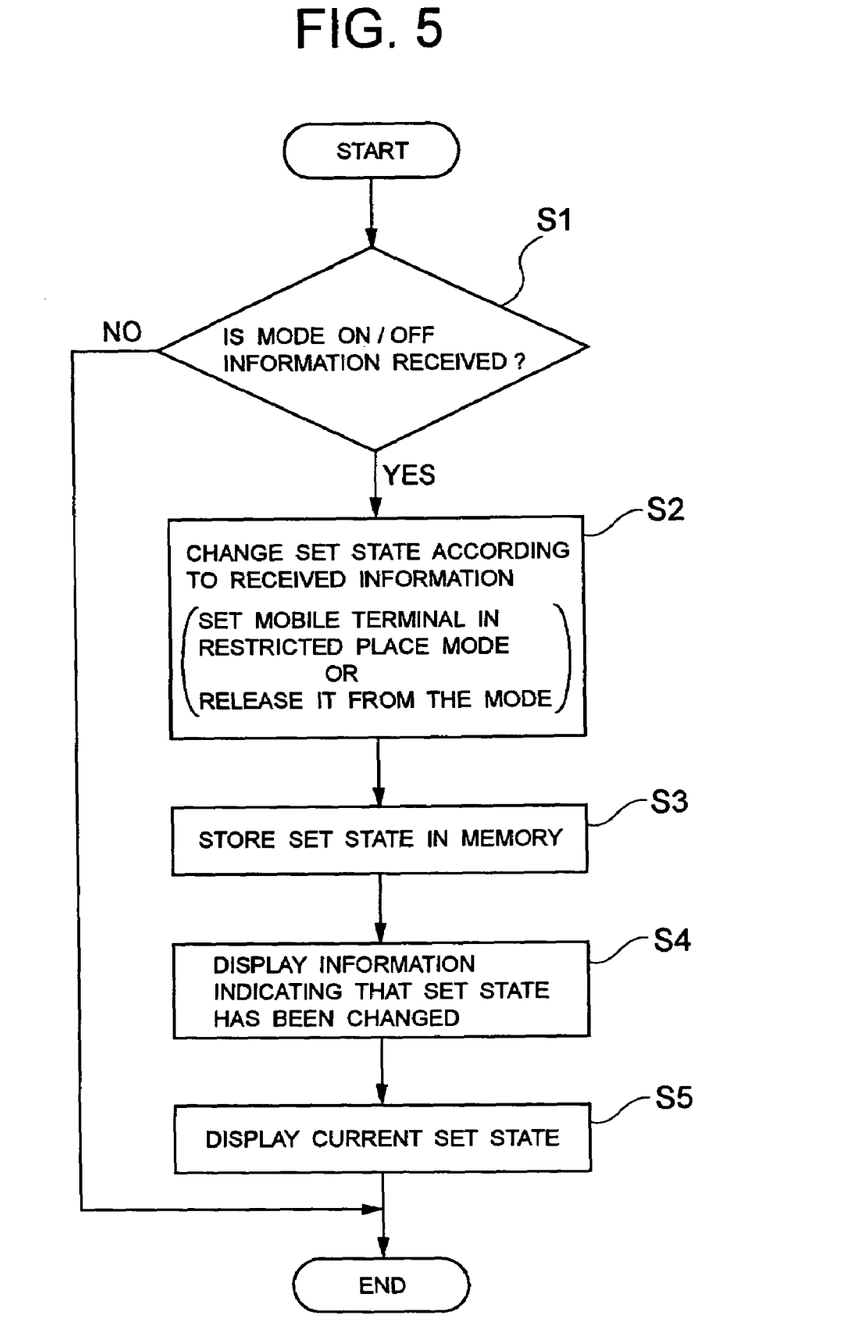
FIG. 5 is a flowchart of the changing operation of the settings of the mobile terminal apparatus shown in FIG. 1.

FIG. 2 shows a changing operation of the settings of the mobile terminal apparatus shown in FIG. 1. FIG. 3 shows the system of the changing operation of the settings of the mobile terminal apparatus shown in FIG. 2'. FIG. 4 is a sequential chart showing the communications of a signal in the system of the changing operation shown in FIG. 3. FIG. 5 is a flowchart of the changing operation of the settings of the mobile terminal apparatus shown in FIG. 1. The changing operations of the settings of the mobile terminal apparatus according to the first embodiment of the present invention are describe below by referring to FIGS. 1 through 5. The process shown in FIG. 5 is realized by the control unit 14 executing the program in the memory 17.

Described below is a series of user operations of changing the set state (ON/OFF of the power and the manner mode) of the mobile terminal apparatus 1 using the built-in contactless IC card 15 in the mobile terminal apparatus 1. In the first embodiment, it is assumed that a ticket for admission into a concert hall, theater, stadium, etc. is required, and the information about the ticket (for example, a starting time, a seat number, etc.) is stored on the contactless IC card 15.

In this case, a holder (user) of the mobile terminal apparatus 1 reserves and purchases in advance a ticket of a concert hall, theater, stadium, etc., obtains the information about the ticket from a ticket issue server 4 through a base station 3 and a network 100 using the mobile terminal apparatus 1, and stores the obtained information on the contactless IC card 15 (refer to (a) shown in FIG. 2).

The holder (user) of the mobile terminal apparatus 1 goes to the concert hall, theater, etc. on the date of the concert, etc., and puts the mobile terminal apparatus 1 having the contactless IC card 15 over a reader/writer 2 mounted in the gate of the concert hall, theater, stadium, etc. (refer to (b) shown in FIG. 2). Then, the settings of the mobile terminal apparatus 1 is automatically rewritten according to the information from the reader/writer 2 (refer to (c) shown in FIG. 2), and thus the set state (ON/OFF of the power and the manner mode) of the mobile terminal apparatus 1 is changed.

That is, since no problems occur if there is no schedule changes in the concert, live performance, play, contents of a performance (of a play, reading, play of a storyteller, etc.) in the concert hall, theatre or stadium, etc., the set state of the mobile terminal apparatus 1 is at least the manner mode in which the mobile terminal apparatus 1 is in the no-tone mode when it receives a call. Therefore, the mobile terminal apparatus 1 is set in the manner mode according to the information from the reader/writer 2.

Thus, according to the first embodiment, the set state of the mobile terminal apparatus 1 can be automatically changed in a restricted place (place where the use of mobile terminal apparatuses are regulated). Therefore, only the mobile terminal apparatus 1 of the user entering the place can be powered off or set in the manner mode. Additionally, in the first embodiment, the settings of the mobile terminal apparatus 1 can be simultaneously rewritten when the user is checked when entering the concert hall, theater, stadium, etc.

Furthermore, according to the first embodiment, only the reader/writer 2 is to be mounted at the gate of the concert hall, theater, stadium, etc. Therefore, the set state of the mobile terminal apparatus 1 can be automatically changed in a restricted place by a simple facility.

The above-mentioned system of changing the set state of the mobile terminal apparatus 1 by the reader/writer 2 is describe below by referring to FIGS. 3 and 4: The mobile terminal apparatus 1 can be set in the "restricted place mode (in which a plurality of settings can be collectively managed)".

If the mobile terminal apparatus 1 approaches or contacts the reader/writer 2, the reader/writer 2 transmits to the mobile terminal apparatus 1 a ticket information confirmation signal a1 to check whether or not the mobile terminal apparatus 1 stores the ticket information.

If the mobile terminal apparatus 1 stores the ticket information on the contactless IC card 15, the ticket information a2 is transmitted to the reader/writer 2. Then, the reader/writer 2 makes an authentication check on the ticket information (refer to a3 shown in FIG. 4). If the information is authenticated, the reader/writer 2 transmits to the contactless IC card 15 a signal a4 (automatic mode change correspondence information) indicating that the reader/writer 2 has the automatic mode change function.

Upon receipt of the signal a4, the contactless IC card 15 transmits to the reader/writer 2 a mode ON/OFF information acquisition request a5 to acquire the mode ON/OFF information. In response to the request, the reader/writer 2 transmits to the contactless IC card 15 a signal a6. (mode ON/OFF information) for switching ON/OFF of the set state (mode) of the mobile terminal apparatus 1 (refer to "a" shown in FIG. 3). Upon receipt of the mode ON/OFF information, the contactless IC card 15 transmits the mode ON/OFF information to the control unit 14 of the mobile terminal apparatus 1 (refer to "b" shown in FIG. 3).

The operation performed inside the mobile terminal apparatus 1 is described below by referring to FIG. 5. In the mobile terminal apparatus 1, when the control unit 14 correctly receives the mode ON/OFF information from the contactless IC card 15 (step S1 shown in FIG. 5), it performs the ON/OFF switch of the "restricted place mode (in which a plurality of settings can be collectively managed)" (step S2 shown in FIG. 5), and the set state of the mobile terminal apparatus 1 is stored in the memory 17 (step S3 shown in FIG. 5). That is, the mobile terminal apparatus 1 is set in the "restricted place mode" when the control unit 14 receives the mode ON information from the contactless IC card 15. On the other hand, the mobile terminal apparatus 1 is released from the "restricted place mode" when the control unit 14 receives the mode OFF information.

Furthermore, the control unit 14 controls the display unit 12 to display that the set state of the mobile terminal apparatus 1 has been switched (step S4 shown in FIG. 5), and the current set state is displayed on the display unit 12 (step S5 shown in FIG. 5).

Thus, according to the first embodiment, when a user enters a restricted place, that is, a concert hall, theater, stadium, etc., the user only has to put the mobile terminal apparatus 1 over the reader/writer 2 to automatically switch the set state without manually setting various functions such as the function of "automatically cutting off radio waves" and the like.

The functions of the mobile terminal apparatus 1 are enabled or disabled (activated or deactivated) by communicating information between the contactless IC card 15 and the reader/writer 2, and desired functions can be collectively set. Furthermore, according to the first embodiment, it is not necessary for the user to operate the mobile terminal apparatus 1 when the user enters a restricted place, thereby avoiding failing to set or reset the mobile terminal apparatus 1. When the settings changed at the entrance are reset, the user is to put the mobile terminal apparatus 1 again over the reader/writer 2 at the exit.

According to the first embodiment, the operation performed when a user enters a concert hall, theater, stadium, etc. is described. However, it can be applied when a ticket is reserved and purchased for a flight, movie theater, train, etc., and also for a hospital, etc. having a consultation ticket issued.

Figure 6:
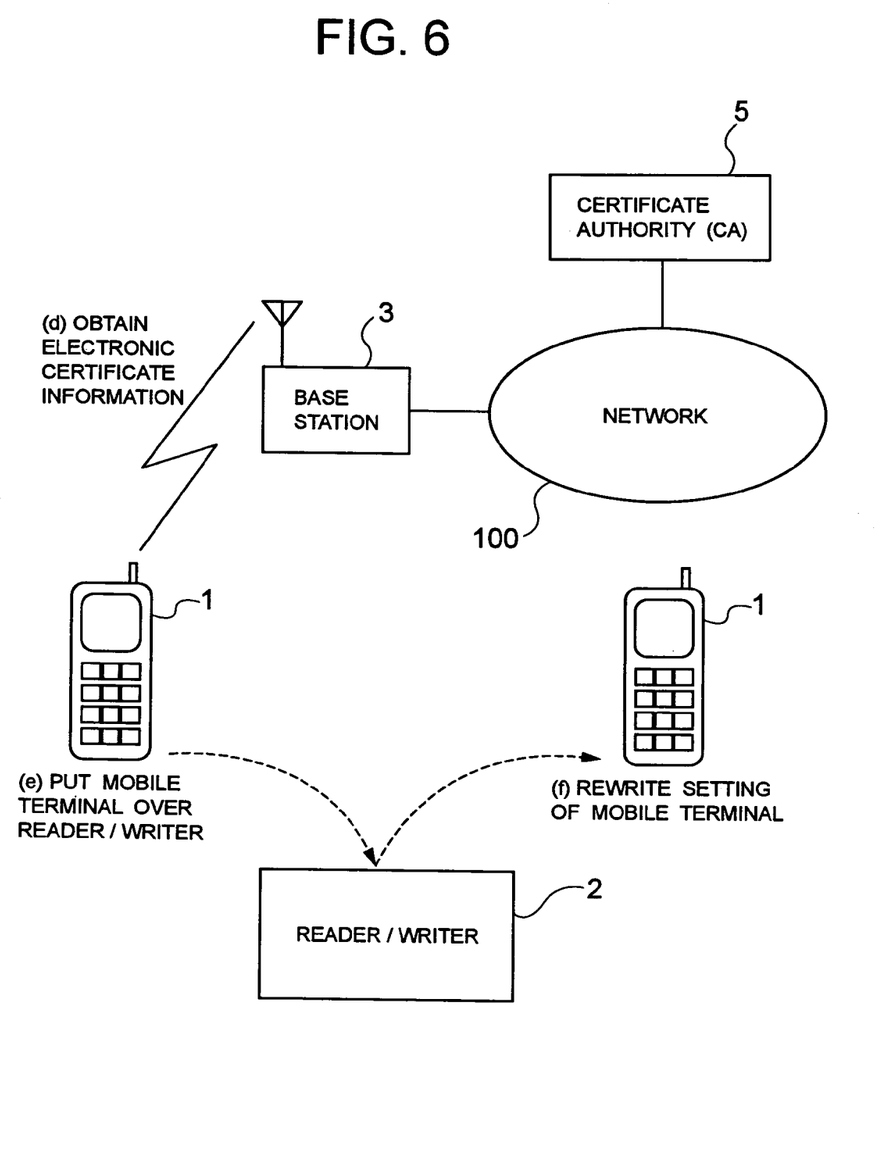
FIG. 6 shows a changing operation of the settings of the mobile terminal apparatus according to a second embodiment of the present invention.
Figure 7:
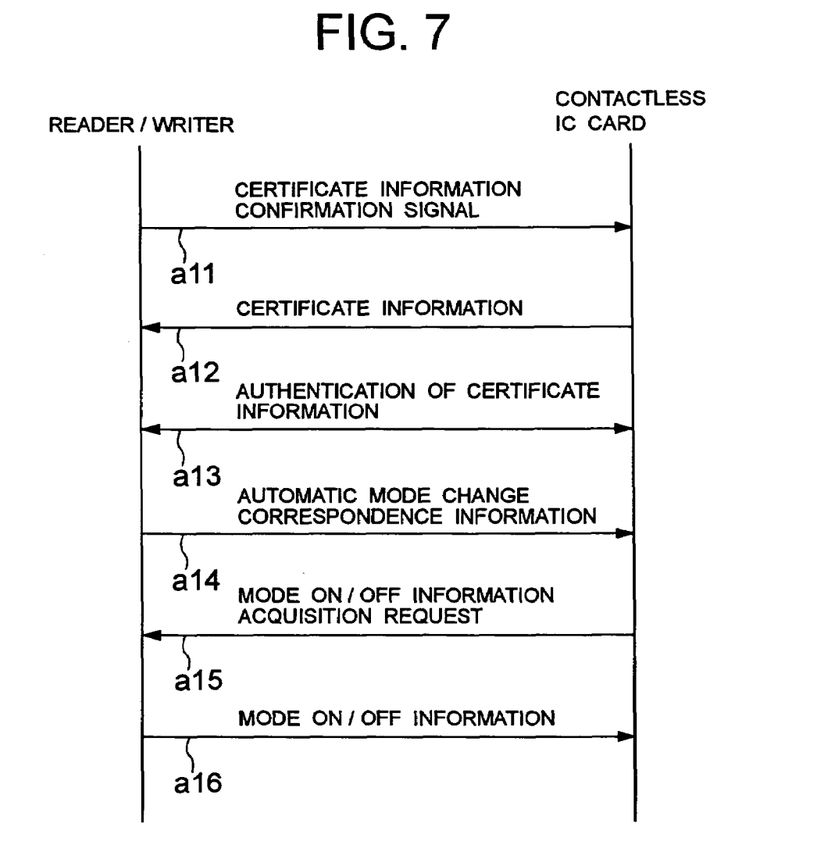
FIG. 7 is a sequential chart showing the communications of a signal in the system of the changing operation shown in FIG. 6.

FIG. 6 shows a changing operation of the settings of the mobile terminal apparatus according to a second embodiment of the present invention. FIG. 7 is a sequential chart showing the communications of a signal in the system of the changing operation shown in FIG. 6. According to the second embodiment of the present invention, it has the same configuration as the system shown in FIG. 2 except that certificate authority (CA) 5 for issuing an electronic certificate on behalf of the ticket issue server 4 is mounted, and the same components are assigned the corresponding reference numerals shown in FIG. 2.

The configuration of the mobile terminal apparatus according to the second embodiment has the same configuration as the mobile terminal apparatus 1 according to the first embodiment of the present invention shown in FIG. 1. The changing operation of the settings of the mobile terminal apparatus according to the second embodiment of the present invention is described below by referring to FIGS. 1, 6, and 7.

A series of user operations of changing the set state (ON/OFF of the power and the manner mode) of the mobile terminal apparatus 1 using the built-in contactless IC card 15 in the mobile terminal apparatus 1 is described below. In the second embodiment, it is assumed that a holder (user) of the mobile terminal apparatus 1 records the mobile terminal apparatus 1 in the certificate authority 5, and the electronic certificate issued by the certificate authority 5 is stored on the contactless IC card 15.

In this case, the holder (user) of the mobile terminal apparatus 1 obtains an electronic certificate issued by the certificate authority 5 through the base station 3 and the network 100 using the mobile terminal apparatus 1, and the information (electronic certificate) is stored on the contactless IC card 15 (refer to (d) shown in FIG. 6).

When the holder (user) of the mobile terminal apparatus 1 puts the mobile terminal apparatus 1 containing the contactless IC card 15 over the reader/writer 2 mounted in the gate of a concert hall, theater, stadium, etc. (refer to (e) shown in FIG. 6), the settings of the mobile terminal apparatus 1 are automatically rewritten according to the information from the reader/writer 2 (refer to (f) shown in FIG. 6), and the set state (ON/OFF of the power and the manner mode) of the mobile terminal apparatus 1 is changed.

That is, since no problems occur if there is no schedule changes in the concert, live performance, play, contents of a performance (of a play, reading, play of a storyteller, etc.) in the concert hall, theatre or stadium etc., the set state of the mobile terminal apparatus 1 is at least the manner mode in which the mobile terminal apparatus 1 is in the no-tone mode when it receives a call. Therefore, the mobile terminal apparatus 1 is set in the manner mode according to the information from the reader/writer 2.

Thus, according to the second embodiment, the set state of the mobile terminal apparatus 1 can be automatically changed in a restricted place (place where the use of mobile terminal apparatuses are regulated). Therefore, only the mobile terminal apparatus 1 of the user entering the place can be powered off or set in the manner mode. Furthermore, according to the second embodiment, only the reader/writer 2 is to be mounted at the gate of the concert hall, theater, stadium, etc. Therefore, the set state of the mobile terminal apparatus 1 can be automatically changed in a restricted place by a simple facility.

The above-mentioned system of changing the settings of the mobile terminal apparatus 1 by the reader/writer 2 is describe below by referring to FIG. 7. The mobile terminal apparatus 1 can be set in the "restricted place mode (in which a plurality of settings can be collectively managed)".

If the mobile terminal apparatus 1 approaches or contacts the reader/writer 2, the reader/writer 2 transmits to the mobile terminal apparatus 1 a certificate information confirmation signal a11 to check whether or not the mobile terminal apparatus 1 stores the electric certificate information.

If the mobile terminal apparatus 1 stores the certificate information (electronic certificate) on the contactless IC card 15, the certificate information a12 is transmitted to the reader/writer 2. Then, the reader/writer 2 makes an authentication check on the certificate information (refer to a13 shown in FIG. 7). If the information is authenticated, the reader/writer 2 transmits to the contactless IC card 15 a signal a14 (automatic mode change correspondence information) indicating that the reader/writer 2 has the automatic mode change function.

Upon receipt of the signal a14, the contactless IC card 15 transmits to the reader/writer 2 a mode ON/OFF information acquisition request a15 to acquire the mode ON/OFF information. In response to the request, the reader/writer 2 transmits to the contactless IC card 15 a signal a16 (mode ON/OFF information) for switching ON/OFF of the set state (mode) of the mobile terminal apparatus 1. Upon receipt of the mode ON/OFF information, the contactless IC card 15 transmits the mode ON/OFF information to the control unit 14 of the mobile terminal apparatus 1.

Thus, according to the second embodiment, when a user enters a restricted place, that is, a concert hall, theater, stadium, etc., the user only has to put the mobile terminal apparatus 1 over the reader/writer 2 to automatically switch the set state without manually setting various functions such as the function of "automatically cutting off radio waves" and the like.

The functions of the mobile terminal apparatus 1 are enabled or disabled by communicating information between the contactless IC card 15 and the reader/writer 2, and desired functions can be collectively set. Furthermore, according to the second embodiment, it is not necessary for the user to operate the mobile terminal apparatus 1 when the user enters a restricted place, thereby avoiding failing to set or reset the mobile terminal apparatus 1. When the settings changed at the entrance are reset, the user is to put the mobile terminal apparatus 1 again over the reader/writer 2 at the exit.

Furthermore, since the authentication of the mobile terminal apparatus 1 can be confirmed by the electronic certificate issued by the certificate authority 5 according to the second embodiment, the above-mentioned ticket information can be encrypted using the electronic certificate.

According to the second embodiment, the operation performed when a user enters a concert hall, theater, stadium, etc. is described. However, it can be applied when a ticket is reserved and purchased for a flight, movie theater, train, etc., and also for a hospital, etc. having a consultation ticket issued.

Figure 8:
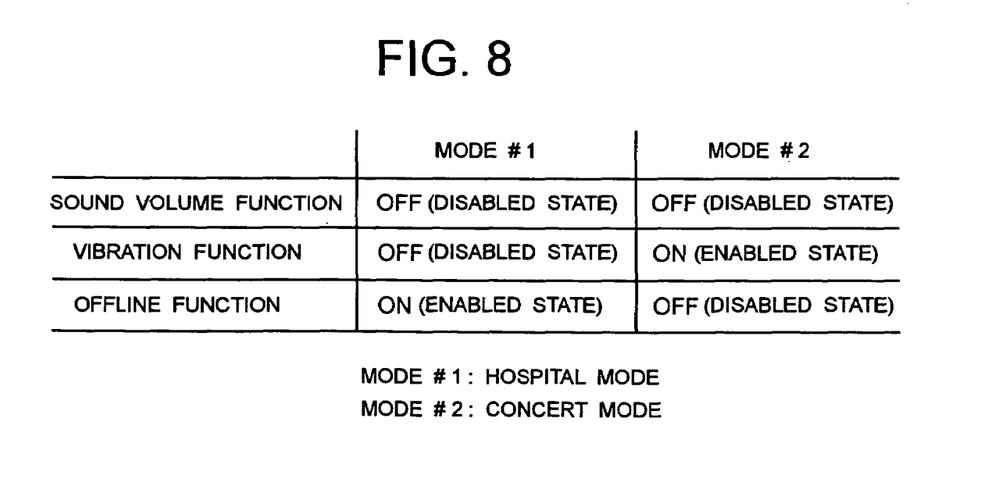
FIG. 8 shows the settings in each mode according to a third embodiment of the present invention.
Figure 9:
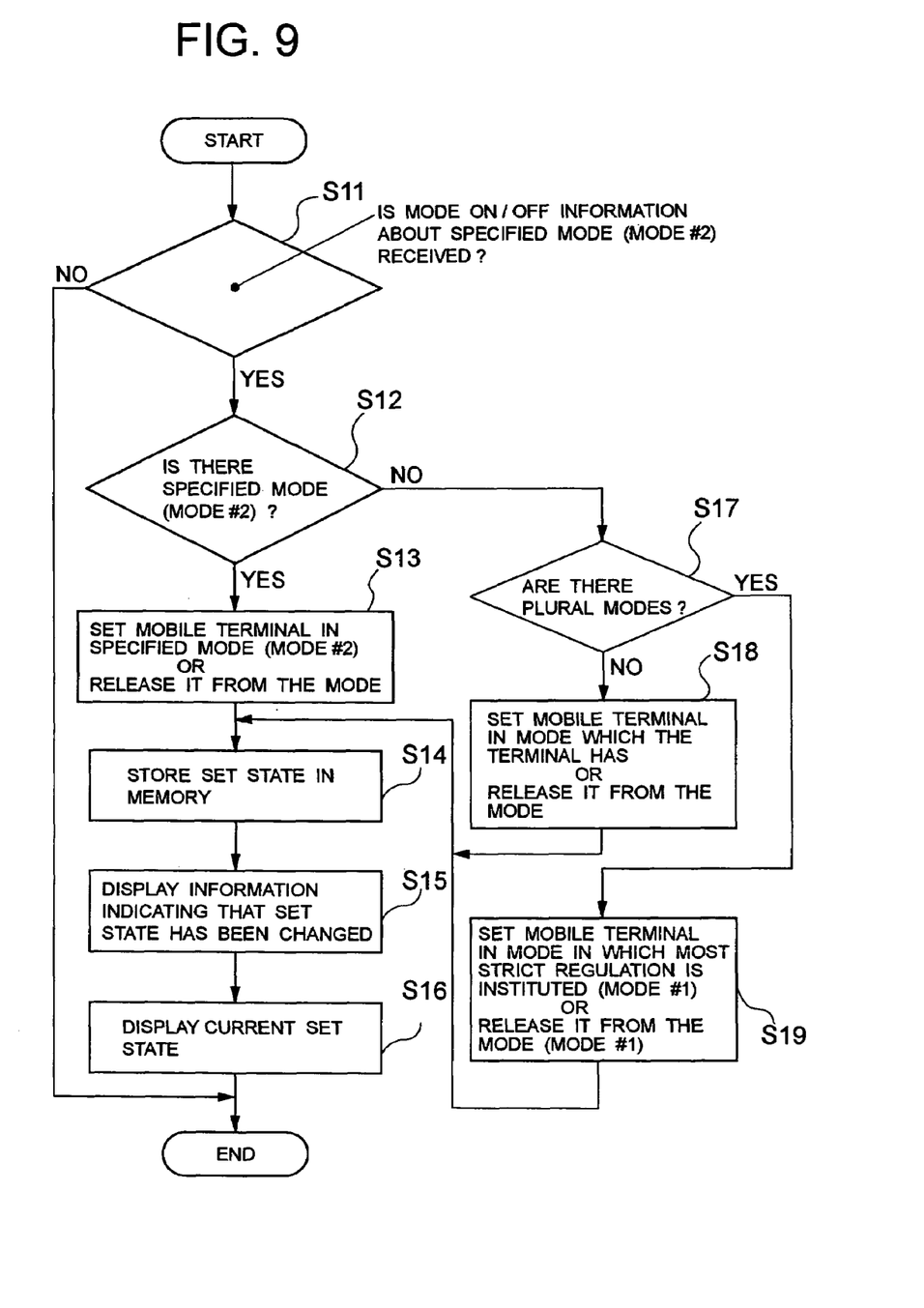
FIG. 9 is a flowchart showing a changing operation of the settings of the mobile terminal apparatus according to the third embodiment of the present invention.

FIG. 8 shows the settings for each mode according to a third embodiment of the present invention. FIG. 9 is a flowchart of a changing operation of the settings of the mobile terminal apparatus according to the third embodiment of the present invention. The configuration of the mobile terminal apparatus according to the third embodiment has the same configuration as the mobile terminal apparatus L according to the first embodiment of the present invention shown in FIG. 1. The configuration of the system according to the third embodiment of the present invention has the same configuration as the system according to the first embodiment of the present invention shown in FIG. 2. The changing operation of the settings of the mobile terminal apparatus according to the third embodiment of the present invention is described below by referring to FIGS. 1, 8, and 9. The process shown in FIG. 9 is realized by the control unit 14 executing the program in the memory 17.

According to the third embodiment, the mobile terminal apparatus 1 has a plurality of "restricted place modes" each capable of collectively managing a plurality of settings. The mobile terminal apparatus 1 can be set in any of the "restricted place modes", and selects an appropriate mode depending on the situation. The operation of setting to a specified mode is described below by referring to FIGS. 1, 8 and 9.

The mobile terminal apparatus 1 can be set in any of the "restricted place modes" such as a hospital mode, a train mode, a concert mode (rock, classical, etc.). In the following explanation, the mobile terminal apparatus 1 can be set in any of two modes, that is, mode #1 (hospital mode) and mode #2 (concert mode) as shown in FIG. 8. An information on the two modes is stored in the memory 17. The settings of these modes can be changed by a user.

As shown in FIG. 8, when the mobile terminal apparatus 1 is set in the mode #1 (hospital mode), the sound volume function is disabled (deactivated), the vibration function is disabled, and the offline function is enabled (activated). When the mobile terminal apparatus 1 is set in the mode #2 (concert mode), the sound volume function is disabled, the vibration function is enabled, and the offline function is disabled.

The operations of the sound volume function and the vibration function are performed by the notification unit 13, the operation of the off line function is performed by the transmission/reception unit 16, and the notification unit 13 and the transmission/reception unit 16 are controlled by the control unit 14.

When the mobile terminal apparatus 1 approaches or contacts the reader/writer 2, the reader/writer 2 transmits a mode ON/OFF information about the specified mode (mode #2) to the contactless IC card 15. The contactless IC card 15 transmits the information to the control unit 14.

Upon receipt of the mode ON/OFF information about the specified mode (mode #2) from the contactless IC card 15 (step S11 shown in FIG. 9), the control unit 14 switches the ON/OFF of the mode (mode #2) (step S13 shown in FIG. 9) if the specified mode (mode #2) is stored in the memory 17 (step S12 shown in FIG. 9). That is, the mobile terminal apparatus 1 is set in the specified mode (mode #2) when the control unit 14 receives the mode ON information about the specified mode (mode #2). On the other hand, the mobile terminal apparatus 1 is released from the specified mode (mode #2) when the control unit 14 receives the mode OFF information about the specified mode (mode #2).

If the specified mode (mode #2) is not stored in the memory 17 (step S12 shown in FIG. 9), and if the mobile terminal apparatus 1 has only one "restricted place mode" (step S17 shown in FIG. 9), the control unit 14 switches the ON/OFF state of the one "restricted place mode" which the mobile terminal apparatus 1 has (step S18 shown in FIG. 9). That is, the mobile terminal apparatus 1 is set in the one "restricted place mode" if the mode ON information is received at the step S11. On the other hand, the mobile terminal apparatus 1 is released from the one "restricted place mode" if the mode OFF information is received at the step S11.

If the mobile terminal apparatus 1 has a plurality of "restricted place modes" (step S17 shown in FIG. 9), but the specified mode is not included in the plurality of "restricted place modes", then the control unit 14 switches the ON/OFF state of the mode #1 (in which most strict regulation is instituted) (step S19 shown in FIG. 9). That is, the mobile terminal apparatus 1 is set in the mode #1 if the mode ON information is received at the step S11. On the other hand, the mobile terminal apparatus 1 is released from the mode #1 if the mode OFF information is received at the step S11.

After the above-mentioned process, the control unit 14 stores the set state of the mobile terminal apparatus 1 in the memory 17 (step S14 shown in FIG. 9), and the information indicating that the set state has been changed is displayed on the display unit 12 (step S15 shown in FIG. 9), and the current set state is displayed on the display unit 12 (step S16 shown in FIG. 9).

Thus, according to the third embodiment, the mobile terminal apparatus 1 has a plurality of "restricted place modes", and it can select an appropriate mode depending on the situation.

In each of the above-mentioned embodiments, a contactless IC card is used as a contactless IC device, which is a built-in device of the mobile terminal apparatus, for communicating with a reader/writer which is external equipment. However, the contactless IC device according to the present invention is not limited to a card, but can be another type of IC device such as a contactless IC chip.

When a contactless IC chip is used, it is provided with an optical transmission/reception device or an electromagnetic wave transmission/reception device so that the signal sequence shown in FIGS. 4 and 7 can be executed between the contactless IC chip and the external equipment (reader/writer) by communicating an optical signal or an electromagnetic signal, and the mode ON/OFF information about the mode shown in FIG. 8 can be communicated. In the present invention, the communications between the contactless IC device and the external equipment can be performed through contactless communication means provided for each of the contactless IC device and the external equipment using an optical signal (infrared signal), an electromagnetic signal or the like.

Furthermore, in the present invention, the mobile terminal apparatus shown in FIG. 1 can be a mobile terminal apparatus with a camera connected to the control unit 14. In this case, the ON/OFF settings of the camera are added to, for example, the ON/OFF settings of the mode as shown in FIG. 8 so that the ON/OFF settings of the camera can be controlled through the external equipment.

In the explanation above, ticket information and certificate information are used, but member information, etc. issued by predetermined organizations (public organizations and private organizations) can be used. That is, the present invention is not limited to specified applications.

Ad described above, a mobile terminal apparatus according to the present invention can obtain the effect that only the mobile terminal apparatus of a user entering a specific institution can be powered off without fail by providing a contactless IC (integrated circuit) device for use in communicating with external equipment by radio waves, and accumulating authentication information from a higher-level apparatus, and control means for enabling or disabling specified functions according to information received from the external equipment through the contactless IC device.

What is claimed is:

1. A mobile terminal apparatus, comprising:
   a contactless IC (integrated circuit) device for use in communicating with external equipment by radio waves accumulating authentication information from a higher-level apparatus, and transmitting the authentication information to the external equipment; and
   control means for enabling or disabling specified functions of the mobile terminal apparatus according to information received from the external equipment through the contactless IC device after the external equipment checks the authentication information received from the contactless IC device.

2. The mobile terminal apparatus according to claim 1, wherein
   the external equipment is a reader/writer capable of reading and writing information from and to the contactless IC device.

3. The mobile terminal apparatus according to claim 1, wherein
   the mobile terminal apparatus has a plurality of modes in each of which the respective enabled/disabled state of the specified functions is set in advance, the contactless IC device performs communications with the external equipment about a mode, and the control means enables or disables the specified functions according to the mode specified by the external equipment.

4. The mobile terminal apparatus according to claim 1, wherein
   the specified functions include at least a power supply function, a sound volume function, a vibration function, and an offline function.

5. The mobile terminal apparatus according to claim 1, wherein
   the higher-level apparatus is a ticket issue server for issuing ticket information for use in authenticating an admission into an institution.

6. The mobile terminal apparatus according to claim 1, wherein
   the higher-level apparatus is a certificate authority for issuing an electronic certificate.

7. A mobile terminal settings changing system, comprising:
   a higher-level apparatus for issuing authentication information;
   a mobile terminal apparatus comprising a contactless IC (integrated circuit) device for accumulating the authentication information from the higher-level apparatus and transmitting the authentication information to external equipment, and control means for enabling or disabling specified functions of the mobile terminal apparatus according to information received through the contactless IC device; and
   the external equipment for communicating with the contactless IC device by radio waves, and transmitting the information to the contactless IC device after checking the authentication information received from the contactless IC device.

8. The mobile terminal settings changing system according to claim 7, wherein
   the external equipment is a reader/writer capable of reading and writing information from and to the contactless IC device.

9. The mobile terminal settings changing system according to claim 7, wherein
   the mobile terminal apparatus has a plurality of modes in each of which the respective enabled/disabled settings of the specified functions is set in advance, the external equipment performs communications with the contactless IC device about a mode after checking the authentication information, and the control means enables or disables the specified functions according to the mode specified by the external equipment.

10. The mobile terminal settings changing system according to claim 7, wherein
    the specified functions include at least a power supply function, a sound volume function, a vibration function, and an offline function.

11. The mobile terminal settings changing system according to claim 7, wherein the higher-level apparatus is a ticket issue server for issuing ticket information for use in authenticating an admission into an institution.

12. The mobile terminal settings changing system according to claim 7, wherein
the higher-level apparatus is a certificate authority for issuing an electronic certificate.

13. A mobile terminal settings changing method, comprising the steps of:
transmitting authentication information to external equipment through a contactless IC (integrated circuit) device stored in a mobile terminal apparatus for use in communicating with the external equipment by radio waves, and accumulating the authentication information from a higher-level apparatus;
receiving information from the external equipment through the contactless IC device after the external equipment checks the authentication information received from the contactless IC device; and
enabling or disabling specified functions of the mobile terminal apparatus according to the received information.

14. The mobile terminal settings changing method according to claim 13, wherein
the external equipment is a reader/writer capable of reading and writing information from and to the contactless IC device.

15. The mobile terminal settings changing method according to claim 13, wherein
the mobile terminal apparatus has a plurality of modes in each of which the respective enabled and disabled settings of the specified functions is set in advance, the contactless IC device performs communications with the external equipment about a mode, and the specified functions are enabled or disabled according to the mode specified by the external equipment.

16. The mobile terminal settings changing method according to claim 13, wherein
the specified functions include at least a power supply function, a sound volume function, a vibration function, and an offline function.

17. The mobile terminal settings changing method according to claim 13, wherein
the higher-level apparatus is a ticket issue server for issuing ticket information for use in authenticating an admission into an institution.

18. The mobile terminal settings changing method according to claim 13, wherein
the higher-level apparatus is a certificate authority for issuing an electronic certificate.

19. A computer-readable medium containing a perform used to direct a computer to perform the processes of:
transmitting authentication information to external equipment through a contactless IC (integrated circuit) device stored in a mobile terminal apparatus for use in communicating with the external equipment by radio waves, and accumulating the authentication information from a higher-level apparatus;
receiving information from the external equipment through the contactless IC device after the external equipment checks the authentication information received from the contactless IC device; and
enabling or disabling specified functions of the mobile terminal apparatus according to the received information.

* * * * *